(No Model.)
J. BLAIR.
PROCESS OF MAKING WHITE PIGMENTS.
No. 477,735. Patented June 28, 1892.
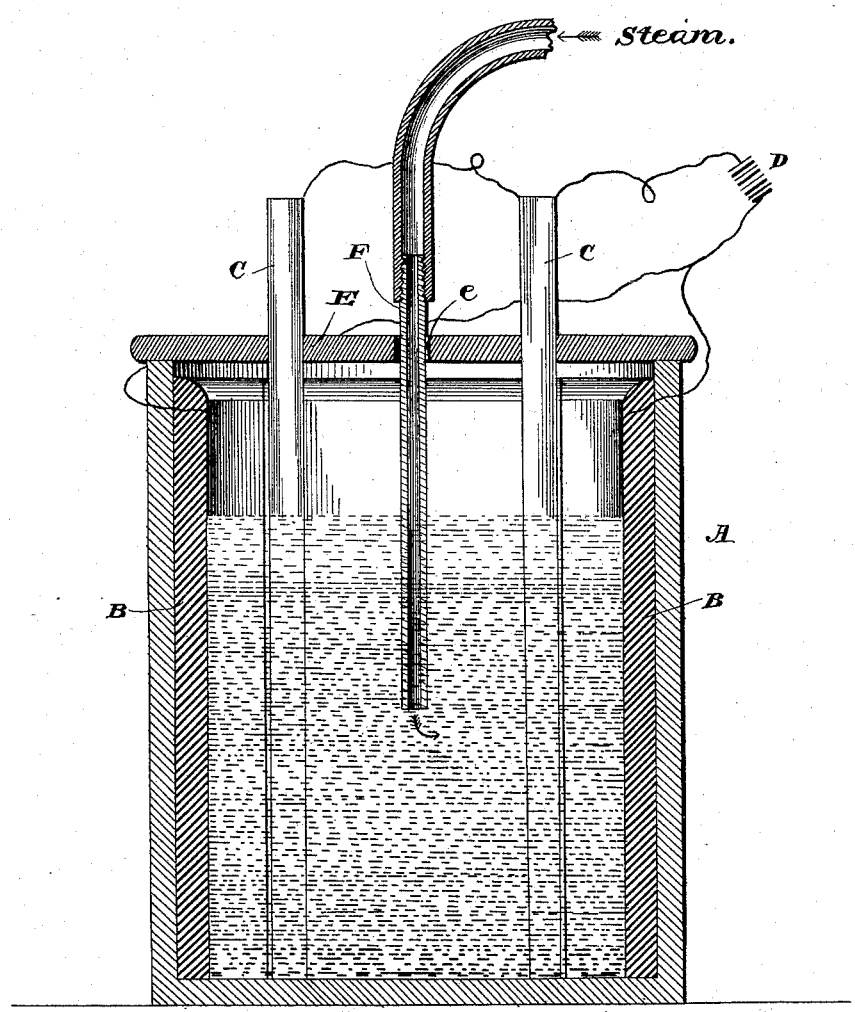
Witnesses
Inventor
John Blair;
By his Attorneys,

UNITED STATES PATENT OFFICE.

JOHN BLAIR, OF SPOKANE, WASHINGTON.

PROCESS OF MAKING WHITE PIGMENTS.

SPECIFICATION forming part of Letters Patent No. 477,735, dated June 28, 1892.

Application filed July 17, 1891. Serial No. 399,842. (No specimens.)

*To all whom it may concern:*

Be it known that I, JOHN BLAIR, a subject of the Queen of Great Britain, residing at Spokane, in the county of Spokane and State of Washington, have invented a new and useful Process of Making a White Pigment, of which the following is a specification.

My invention relates to an improved process for corroding lead into an amorphous salt suitable as a substitute for white paint; and it has for its object to provide a paint that will equal in quality and purpose the ordinary white lead of commerce and at the same time provide means for making the same that will rapidly and efficiently obtain the powder to be used as the pigment, and at the same time provides a complete utilization of all the elements used in carrying out my process; and the invention consists in the corroding of metallic lead in contact with certain chemicals and used in conjunction with a suitable apparatus, all of which will be hereinafter more fully described, illustrated in the accompanying drawing, and specifically pointed out in the appended claims.

In the drawing the figure represents a vertical sectional view in an apparatus employed in carrying out my process.

In carrying out this process I take any suitable vessel, into which I place a charge of chemicals composed of sulphuric acid, ten pounds; sodium or potassium nitrate, five pounds, and water, twelve pounds, and after placing within the vessel a plate or plates of carbon, the use of which will be described, and coils of lead-foil or plates of the same metal, the heat or temperature of the mixture within the vessel is raised to a sufficient degree to cause reaction to set in, and the ultimate reduction of lead to the amorphous state desired to be effected.

Although any vessel for this process can be used, to obtain the most successful results I employ, preferably, such an apparatus as is illustrated in the accompanying drawing, which is indicated by the letter A, which may be constructed of any suitable material that will be acid-proof. The sides of the vessel or vat A are lined with carbon plates B, which are so arranged and fixed that they can be used as an element to form a galvanic current with the lead plates C, inserted within the vessel and mixture previously referred to, and connected with the storage-battery D. The vessel is inclosed by a lid or cover E, constructed of the same material as the plates C, and is provided with a central opening e, through which is inserted the glass or rubber tubing F. After the introduction of sheets of lead within the vessel to provide sufficient quantity of the said metal for forming the powder, steam is introduced through the glass or rubber tubing within the vessel and through the chemical mixture composed of the elements before mentioned, and soon raises the mixture to a sufficient degree of heat to cause reaction to set in, which is accelerated and modified by the galvanic circuit generated by the violent reactions, and causes the metallic lead to be rapidly converted into a soft amorphous white powder, which is composed principally of the sulphate of lead, combined with a certain quantity of the nitrate. This powder is then washed in an alkaline solution composed of water and caustic soda, which precipitates the lead nitrate in the form of a hydrate, which is essential to the production of a white pigment suited to fulfill all the requirements of a good paint. After this first washing is taken off the powder the mother liquor which remains after the process has been carried up to this stage is composed of a mixture of a caustic soda and a small quantity of the nitrate and perhaps some sulphate. This, after being evaporated and fused with a small quantity of charcoal, produces caustic soda, which by-product can be used in part to convert the soluble lead, as already referred to, into the hydrate, thus providing a utilization of every element.

The reaction which takes place during the process is as follows: If sodium nitrate is used in the first charge, the sulphuric acid combines therewith to form sodium sulphate and lead nitrate. The reaction may be stated thus:

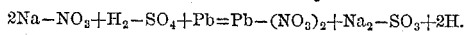

This is evidently the first exchange of elements; but it will be observed that through the agency of the heat and electricity a partial conversion of the nitrate necessarily occurs, and the reaction supposed to take place may be formulated as

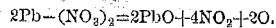

The oxide thus formed, together with the unconverted nitrate, are readily converted into the sulphate, under the principle that the sulphate may be produced by a double decomposition between a salt of lead and a soluble sulphate:

also
$$Pb-O+Na_2-SO_4+H_2-O=Pb-SO_4+2NaOH,$$
$$Pb-(NO_3)_2+Na_2SO_4=Pb-SO_4+2NaNO_3.$$

During the above reaction it will be observed that the gases of hydrogen and oxygen are not only set free, but that $NO_2$ also passes above the liquid in its characteristic red fumes, which first unite with the surplus oxygen, which is readily taken to first form the acid radical, and then with hydrogen and oxygen to form the acid itself, which while forming on the lead lid unites therewith to form the nitrate. By treating this with sulphuric acid it passes to a sulphate and gives off the red fumes. It is difficult to minutely follow the exact exchange of elements; but the above, in connection with the general reactions given, are the result of practical observation. At this point it may also be observed that it is extremely difficult to completely counteract the action of the nitric-acid radical, which under the influence of the heat produced by the violent reactions and the decomposing tendency of the electric current probably causes a collateral reaction, partially reducing the nitrate to a nitrite with the accompanying hydrate, inasmuch as the hydrate has been detected, although this cannot be conclusively stated.

It is thought that the steps of my process are clear without further description.

Having thus described my invention, what I claim, and desire to secure by Letters Patent of the United States, is—

1. The herein-described process of corroding metallic lead into an amorphous powder, consisting in first placing the metallic lead in an acid-proof vessel or vat, adding a chemical charge composed of sulphuric acid, an alkaline nitrate, and water, heating the vessel or vat until reaction sets in and is completed, and finally washing the power or reduced lead in a solution of an alkaline hydrate, substantially as set forth.

2. The herein-described process of corroding metallic lead into an amorphous powder for a pigment, consisting in first placing within a suitable vessel or vat a chemical charge composed of sulphuric acid, an alkaline nitrate, and water, placing within said vessel lead and carbon plates, thus establishing a galvanic circuit between the same, introducing within the vessel loose quantities of lead and then covering the same with a covering of the same substance, then raising the heat of the vessel by the action of steam introduced through the mixture therein to a sufficient degree to cause reaction and decomposition to set in and be completed, and finally washing the powder or reduced lead in a solution of an alkaline hydrate, substantially as described.

In testimony that I claim the foregoing as my own I have hereto affixed my signature in presence of two witnesses.

JOHN BLAIR.

Witnesses:
WM. H. LANCASTER,
FRANK WILSON.